United States Patent
Costanzo

(10) Patent No.: US 6,827,198 B1
(45) Date of Patent: Dec. 7, 2004

(54) TILT CONVEYOR

(75) Inventor: Mark B. Costanzo, River Ridge, LA (US)

(73) Assignee: Laitram, L.L.C., Harahan, LA (US)

( * ) Notice: Subject to any disclaimer, the term of this patent is extended or adjusted under 35 U.S.C. 154(b) by 9 days.

(21) Appl. No.: 10/604,033

(22) Filed: Jun. 23, 2003

Related U.S. Application Data

(60) Provisional application No. 60/260,620, filed on Jan. 9, 2001.

(51) Int. Cl.[7] .............................................. B65G 47/10
(52) U.S. Cl. .................................. 198/370.04; 198/779
(58) Field of Search .............................. 198/370.04, 779

(56) References Cited

U.S. PATENT DOCUMENTS

| | | | | |
|---|---|---|---|---|
| 3,286,811 A | | 11/1966 | McWilliams ................... 198/38 |
| 4,031,998 A | | 6/1977 | Suzuki et al. ................ 198/365 |
| 4,461,378 A | * | 7/1984 | Roth ....................... 198/370.04 |
| 5,086,905 A | | 2/1992 | Polling ........................ 198/365 |
| 5,101,982 A | * | 4/1992 | Gentili ........................ 209/556 |
| 5,353,912 A | * | 10/1994 | Killer et al. ............ 198/370.04 |
| 5,477,955 A | | 12/1995 | Madden et al. ......... 198/370.04 |
| 5,653,326 A | * | 8/1997 | Liedgens ................ 198/370.04 |
| 5,667,054 A | | 9/1997 | van den Goor ......... 198/370.04 |
| 5,894,918 A | | 4/1999 | Bonnet .................... 198/370.04 |
| 5,967,290 A | * | 10/1999 | Bonnet .................... 198/370.04 |
| 5,988,351 A | * | 11/1999 | Warkentin .............. 198/370.04 |
| 6,044,956 A | * | 4/2000 | Henson et al. .......... 198/370.02 |
| 6,247,576 B1 | | 6/2001 | Bonnet .................... 198/370.04 |
| 6,318,544 B1 | * | 11/2001 | O'Connor et al. ............ 198/853 |
| 6,334,526 B1 | | 1/2002 | Hatton ..................... 198/469.1 |
| 6,494,312 B2 | * | 12/2002 | Costanzo ...................... 198/779 |

* cited by examiner

Primary Examiner—Joe Dillon, Jr.
(74) Attorney, Agent, or Firm—James T. Cronvich

(57) ABSTRACT

A tiltable conveyor for offloading conveyed articles over a side of a conveyor belt. The belt is preferably a modular conveyor belt constructed of a series of belt rows hingedly interlinked to form an article-conveying surface. The belt is supported by a carryway, along which the belt is driven in a direction of belt travel by a drive system. The carryway includes one or more tilt sections at which one side of the belt is elevated relative to the other to offload articles across the lower side. The belt may include rollers or be molded of or coated with an inherently slick material to facilitate offloading.

8 Claims, 4 Drawing Sheets

US 6,827,198 B1

TILT CONVEYOR

CROSS REFERENCE TO RELATED APPLICATIONS

This application claims the benefit of U.S. Provisional Patent Application No. 60/260,620, filed Jan. 9, 2001.

BACKGROUND OF INVENTION

1. Field of the Invention

This invention relates to a conveyor arrangement with a tiltable offloading section along the conveyor path and, more particularly, to such an arrangement preferably using a modular conveyor belt.

2. Background Discussion

In the material handling industry, especially the package handling industry, it is often necessary to sort conveyed articles, such as boxes, by size, weight, destination, or some other parameter. One way of sorting articles is to offload them over the side of a conveyor according to preselected sorting criteria at one or more offloading stations. One way to offload articles over the side of the conveyor is to push them. A push rod at one side of the conveyor is actuated to push against the conveyed article and force it off the opposite side to another conveyor or collection area. Another example is a shoe sorter, in which a slat-type conveyor has shoes that can controllably slide laterally in the gaps between consecutive slats. The shoes push articles off the side of the conveyor. These pushing systems work well in many applications, but can be somewhat complex in that they often require tight coordination between the pushing mechanism and the speed of the conveyor. Often, especially with shoe conveyors, the conveyor frame can be quite complex, with diverter channels and other arrangements required to guide or control the motion of the shoes.

Another side-offloading sorting system is the tilt tray, in which a conveyor includes a series of trays, each of which contains one or more articles. The trays are pivotable about a pivot axis parallel to the conveying direction. When a tray reaches a designated offloading station, the tray is tipped about its pivot axis, depositing its load over the side of the conveyor. To prevent articles from tumbling while being offloaded, the trays are specially designed, and the tipping mechanism is carefully controlled. These special-purpose conveyors tend to be rather expensive. Furthermore, the individual trays limit the size of the articles that can be sorted—a drawback in some applications.

The high degree of accuracy and control provided by sorting conveyors like those described and their associated high costs are not necessary in many non-critical applications. Thus, there is a need for a low-cost and simple side-offloading conveyor for the package handling industry.

SUMMARY OF INVENTION

These needs and others are provided by a conveyor having features of the invention. The conveyor, which is designed to offload articles, includes a conveyor belt, such as a modular conveyor belt constructed of a series of rows of belt modules interlinked hinge-like to form an article-conveying surface. The belt is supported by a carryway defining a conveying path. The article-conveying surface extends longitudinally along the carryway and laterally from a first side to a second side defining the width of the belt. A drive system drives the belt continuously or in a stop-and-go fashion along the carryway in a direction of belt travel. The carryway includes a tilt section at which the first side of the belt is elevated relative to the second side to offload articles carried on the article-conveying surface across the lower second side of the belt.

In one version of the conveyor, the belt includes a plurality of rollers mounted in the belt for rotation. A salient portion of each roller extends above the article-conveying surface to engage conveyed articles in rolling contact and facilitate their side-offloading. Preferably, the rollers are cylindrical rollers having an axis of rotation in the direction of belt travel. In another version of the conveyor, the article-conveying surface is flat and molded of a slick plastic material to provide a low-friction sliding surface for offloading at the tilt section.

In another version of the conveyor, the belt carryway at the first side of the belt is higher than at the second side in the tilt section. In still another version, the tilt section is made of a number of lateral slats that are pivotable about a pivot axis parallel to the direction of belt travel. A push rod can be used to push on the underside of the slat to elevate its first side above its second side to control the tilt of the conveyor belt in the tilt section. Thus, a simple modular conveyor belt, such as is available off-the-shelf, can be used to construct an inexpensive side-offloading system.

BRIEF DESCRIPTION OF DRAWINGS

These and other advantages, features, and aspects of the invention are described in more detail in the following description, appended claims, and accompanying drawings, in which:

DETAILED DESCRIPTION

Figure 1:
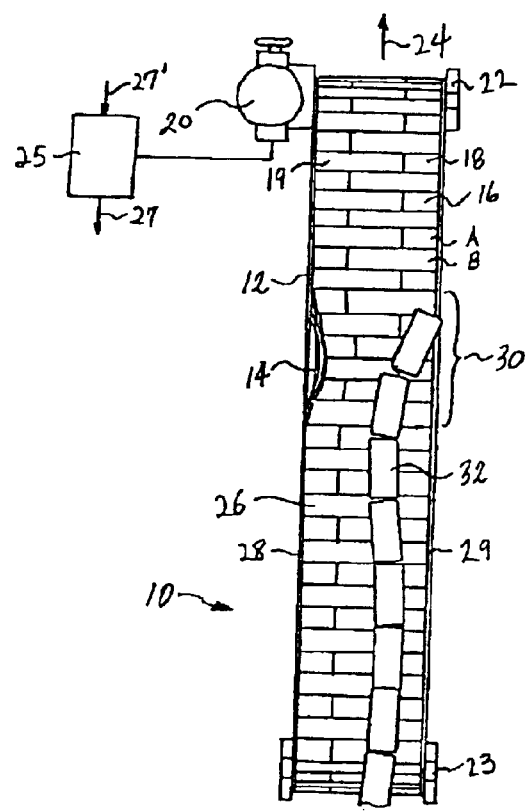
FIG. 1 is a top diagrammatic view of a conveyor embodying features of the invention.

FIG. 1 shows a tilt conveyor embodying features of the invention. The conveyor 10 includes a conveyor frame 12 having a carryway 14 supporting a modular conveyor belt 16. The belt is constructed of a series of rows A, B of belt modules 18, 19 connected side by side and end to end in a bricklaid pattern. In the example shown in FIG. 1, each row includes two side-by-side modules. Consistent with the invention, the belt could be constructed with a single module per row or in a non-bricklaid pattern. The rows are hingedly interlinked end to end to end to allow the belt to articulate about drive and idler sprockets or pulleys. A drive system 20, including a motor, is conventionally connected to sprockets or a pulley by a shaft (not shown) supported by a bearing block 22. The motor drives the belt in a direction of belt travel 24. The other end of the belt is wrapped around an idler pulley or sprockets supported by bearing blocks 23. The drive system could be a simple start-stop control with or without manual speed adjustment or a more sophisticated variable speed control with intelligence, such as that provided by a programmable logic controller 25 having other control outputs 27 and sensed inputs 27'.

Figure 2:
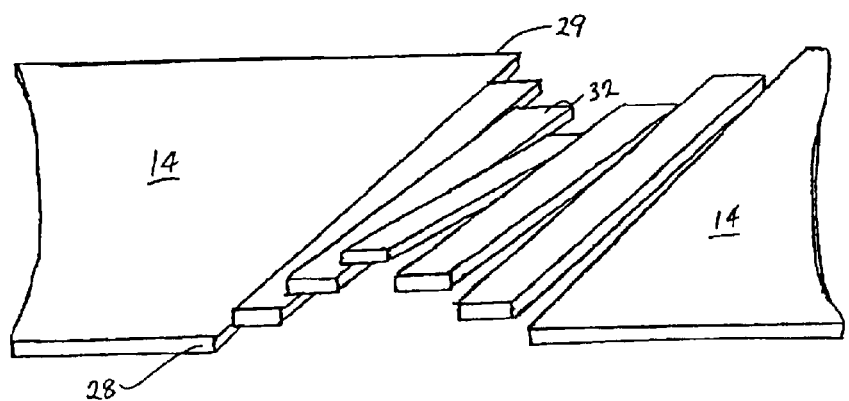
FIG. 2 is an isometric view of a portion of one version of a slatted carryway for use with the conveyor of FIG. 1.
Figure 3:
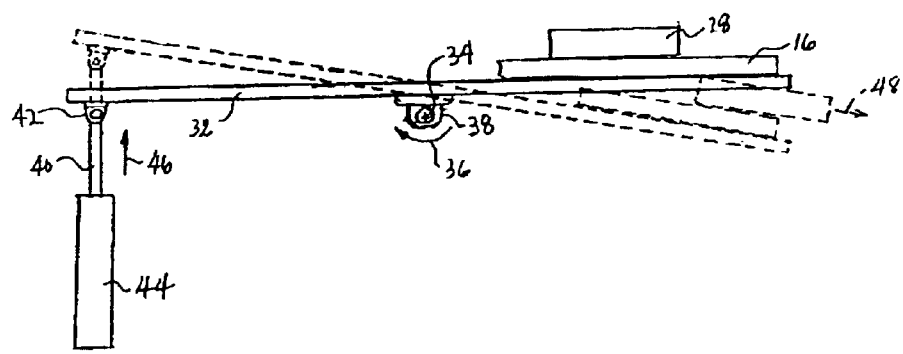
FIG. 3 is an elevation view of a tilting mechanism for one slat of the carryway of FIG. 2.

The belt is preferably a modular plastic conveyor belt, such as are available from Intralox, Inc. of Harahan, La., USA, a subsidiary of the assignee of this invention. The belt in FIG. 1 forms a top article-conveying surface 26 extending longitudinally in the direction of belt travel and laterally from a first side 28 to a second side 29 of the belt defining its width. In the preferred version shown, the carryway portion of the belt is continuous with no barriers that would limit the length of articles placed thereon. It would, however, be within the scope of the invention to provide lateral flights to compartmentalize the belt into sections. The carryway includes a tilt section 30 at which conveyed articles 32 can be offloaded over the second side of the belt. (A typical sorting conveyor may include a number of tilt sections. Only one is shown here for simplicity. Likewise, articles are shown being offloaded over the second side of the belt; it is within the scope of the invention to offload over the first side as well.)In the tilt section, one version of which is shown in more detail in FIGS. 2 and 3, the first side of the belt is elevated relative to the second side so that articles can slide off. As shown in FIGS. 2 and 3, the tilt section replaces the standard carryway 14 with a group of slats 32 that can pivot about a pivot axis 34 according to curved arrow 36 by means of a pivot joint 38 attached to each slat on its underside roughly midway between the sides of the slat. A push rod 40 is pivotally attached to a pivot connection 42 on the underside at an end of the slat. A conveyor-frame-mounted cylinder 44 extends the push rod in the direction of arrow 46 from a first position, in which the slat is coplanar with the carryway 14, to a second tilted position, shown in hatched lines, to cant the carryway and tip the supported belt 16 so that articles 28 can slide off the side in the direction of arrow 48. Each of the slats can be attached to its own push rod and cylinder, or a single push rod could be attached to a generally convex push plate coacting with the undersides of the series of slats to push them in unison. With the push rod arrangement, the characteristics of the belt section can be changed from no tilt to a range of tilts. The tilt can be coordinated with the drive system by the controller 25 in FIG. 1.

Figure 4:
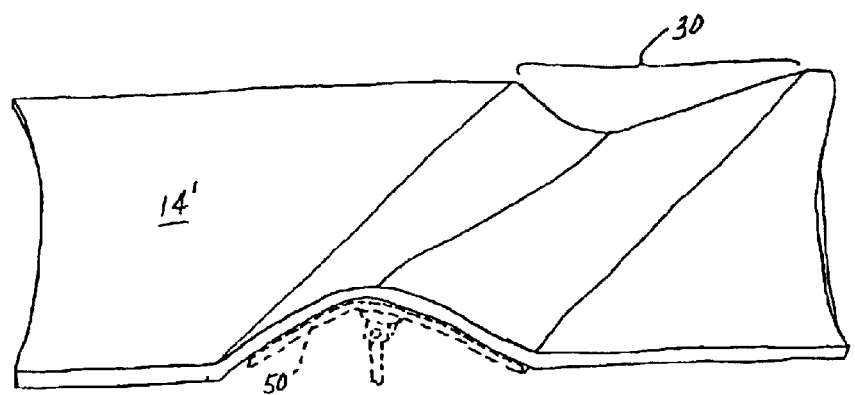
FIG. 4 is an isometric view of a portion of another version of carryway usable with the conveyor of FIG. 1.

Another version of tilt section 30 of the carryway is shown in FIG. 4. In this example, the carryway 14' is preformed in a tilted shape so that as the belt rides over the tilt section, articles carried on it can slide off the lower side. The tilt section could alternatively be formed of a flexible material made to assume the tilted shape shown in FIG. 4 by a push plate 50, shown in phantom, attached to a pivot and push rod. Thus, like the tilt section of FIGS. 2 and 3, the tilt section of FIG. 4 can be either passive or active.

Although metal conveyor belts or chains, and even fabric belts, can be used with the conveyor of the invention, the preferred belt is a modular plastic conveyor belt. These belts are typically made by injection molding out of thermoplastic material. The most common materials include polypropylene, polyethylene, and acetal. Many belts usable in the conveyor of this invention are readily available. For example, the belt section shown in FIG. 5 has many of the characteristics of the INTRALOXSeries 400 Roller Top belt. The belt section shown comprises two modules 52, 53 each having interleaved forward 54 and trailing 55 link ends, or hinge eyes. The hinge eyes include a lateral bore 56 forming a passageway across the width of the belt. A hinge pin, or pivot rod 58, disposed in the passageway, holds adjacent modules together at a hinge joint. A belt made of many rows of such modules is driven in the direction of arrow 60 by, for example, motor-driven sprockets engaging underside belt structure.

Figure 5:
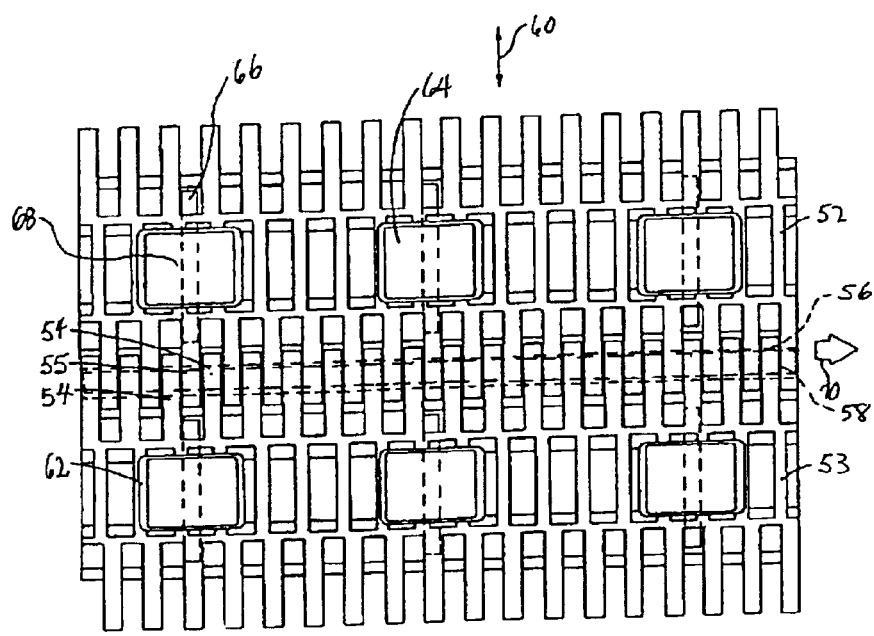
FIG. 5 is a top view of two roller-top conveyor belt modules usable in the conveyor of FIG. 1.

The belt modules also have recesses 62 opening onto the conveying surface. Rollers—in this case, cylindrical rollers 64—are disposed in each recess. An axle 66 spanning each recess in the direction of belt travel is retained in the module. A bore in each cylindrical roller admits the axle so that the roller is free to rotate about the axle. A salient portion 68 of each roller protrudes above the article-conveying surface. Whenever an article on the belt reaches the tilt section of the carryway, with the left side as depicted in FIG. 5 higher than the right side, the article, aided by the freely rotating rollers and gravity, slides easily off the side of the belt in the direction of arrow 70. Thus, this side transfer roller belt is effective at side-offloading in the tilt section of a conveyor path.

Figure 6:
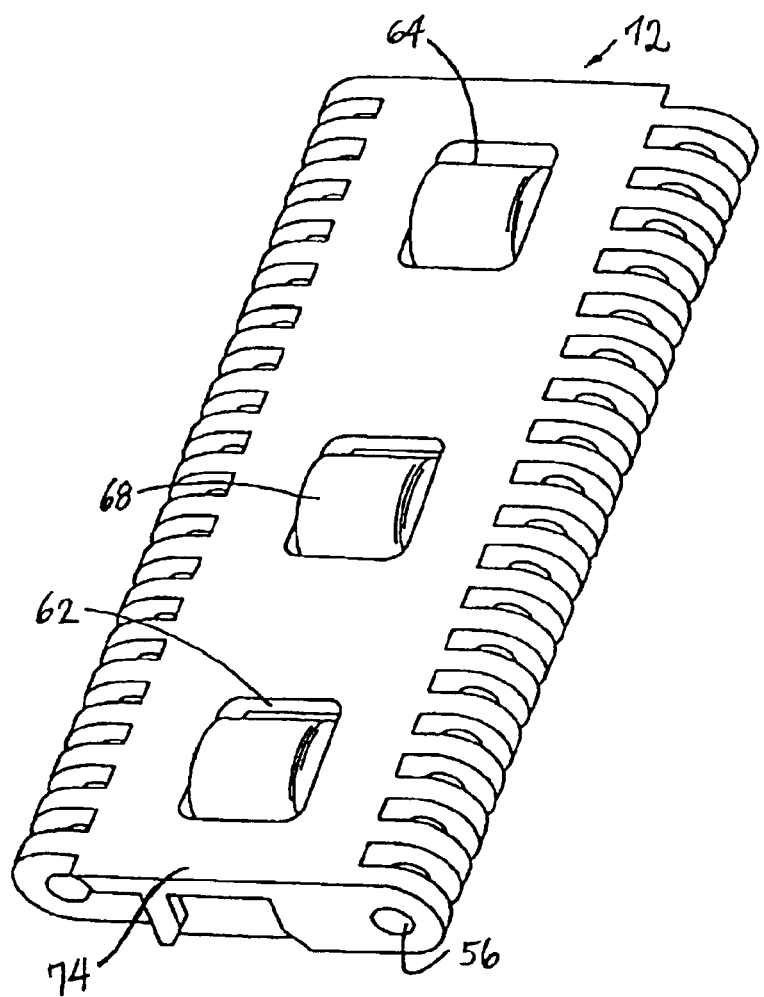
FIG. 6 is an isometric view of another version of belt module that can be used in the conveyor of FIG. 1.

A belt module similar to that in FIG. 5 is shown in FIG. 6. The module 72 differs from those in FIG. 5 principally in that its top article-conveying surface 74 is continuous, except for the roller recesses 62. This module, when interconnected with other similar modules into a belt, would also be effective at side-offloading articles in a tilt section. In fact, if the module is made of a slick material such as acetal, in some applications the rollers are not even necessary. A module with a completely flat surface, without recesses and rollers, would suffice to transfer articles off the side in a tilt section.

Thus, the invention has been described with respect to various versions of tilt carryway sections and belt constructions. Even so, those skilled in the art will appreciate that other modifications of the example versions are possible without materially departing from the novel teachings and advantages of the invention. For example, the rollers could be spherical as well as cylindrical and could be rotatably retained without an axle. Other methods of realizing a tilted carryway are also possible. As another example, the belt could be a flat rubber or fabric belt with embedded rollers or coated with a low-friction material, such as materials containing TEFLON or silicon, to help articles slide off the tilted belt. As the examples suggest, these and other modifications are intended to be included within the scope of the invention as defined by the following claims.

What is claimed is:

1. A conveyor for offloading articles, comprising:

a conveyor belt forming an article-conveying surface extending laterally from a first side to a second side and longitudinally in the direction of belt travel;

a belt carryway supporting the belt;

a drive system driving the belt along the carryway in the direction of belt travel; and the belt carryway including a tilt section elevating the first side of the belt relative to the second side to offload articles carried on the article-conveying surface across the lower second side of the belt at the tilt section, wherein the conveyor belt is a modular conveyor belt including a series of rows of belt modules hingedly interlinked.

2. A conveyor as in claim 1, wherein the conveyor belt further includes a plurality of rollers rotatably mounted in the belt with a salient portion extending above the article-conveying surface to engage conveyed articles in rolling contact.

3. A conveyor as in claim 2, wherein the rollers are rotatable about an axis parallel to the direction of belt travel.

4. A conveyor as in claim 1, wherein the conveyor belt is a modular conveyor belt including a series of rows of belt modules hingedly interlinked and wherein the belt modules are molded of an inherently slick plastic material to provide a low-friction article-conveying surface.

5. A conveyor as in claim 1, wherein the belt carryway at the first side of the belt is elevated relative to the belt carryway at the second side of the belt in the tilt section.

6. A conveyor as in claim 1, wherein the tilt section includes a plurality of lateral slats forming the carryway, the lateral slats being pivotable about a pivot axis parallel to the direction of belt travel to tilt the belt with the first side of the belt elevated relative to the second side of the belt.

7. A conveyor as in claim 6, further comprising a tilt control connected to each of the slats to control the degree of tilt of each.

8. A conveyor as in claim 7, wherein the tilt control comprises a push rod engaging the slat at the first side of the belt.

* * * * *